July 21, 1970   J. L. SHAGENA, JR   3,521,050
RECHARGEABLE FLASHLIGHT
Filed May 20, 1968
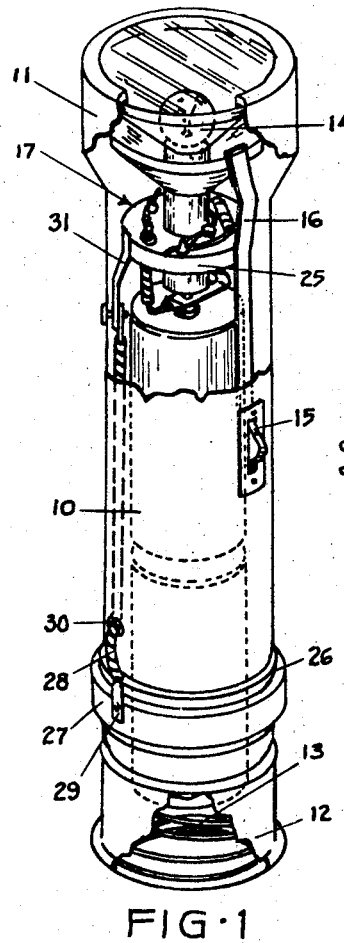
FIG·1
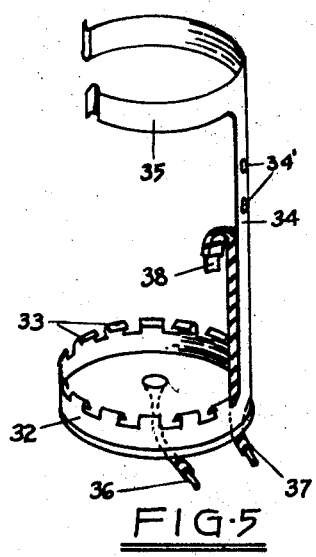
FIG·5
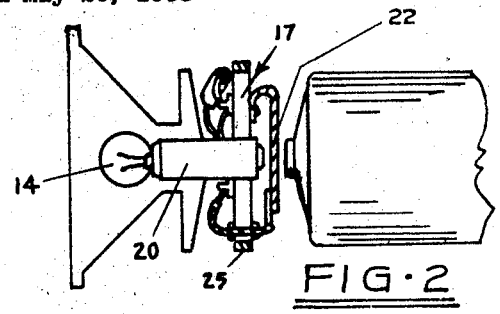
FIG·2
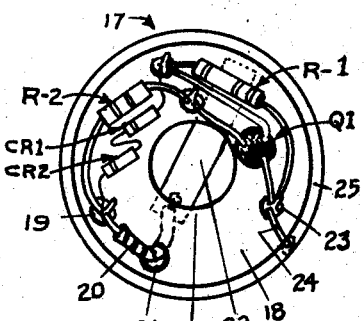
FIG·3
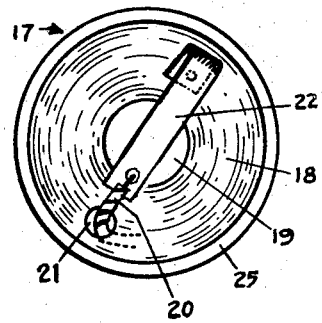
FIG·4
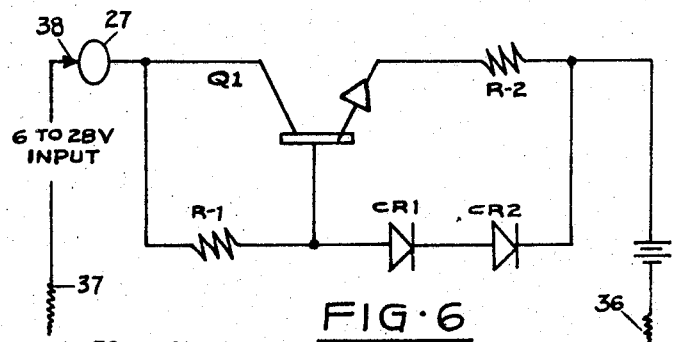
FIG·6
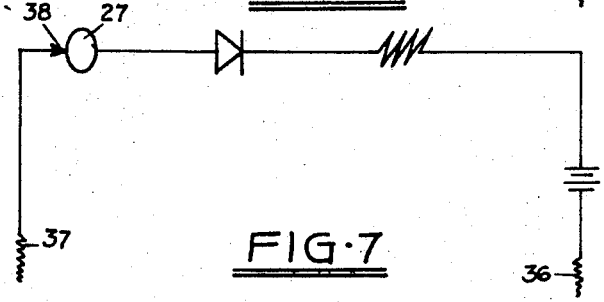
FIG·7
INVENTOR
JACK L. SHAGENA JR.
BY *[signature]* ATTORNEY
*[signature]* AGENT

United States Patent Office 3,521,050
Patented July 21, 1970

3,521,050
RECHARGEABLE FLASHLIGHT
Jack L. Shagena, Jr., 1406 Saratoga Drive,
Bel Air, Md. 21014
Filed May 20, 1968, Ser. No. 730,259
Int. Cl. F21l 7/00
U.S. Cl. 240—10.66                              8 Claims

ABSTRACT OF THE DISCLOSURE

A rechargeable flashlight having a built in rectifier and voltage regulator with electrical terminals accessible from the exterior of the flashlight and a holder or support for the flashlight with electrical terminals to connect with those of the flashlight and adapted to connect with a source of electricity for charging the battery of the flashlight when the latter is placed in the holder.

---

This invention relates to electric flashlights and more particularly to flashlights having batteries of the rechargeable type and in which the entire complement of electrical components necessary to insure the proper voltage and current for recharging the batteries, commonly referred to as the "battery charger," is contained entirely within the flashlight casing and in which the batteries may be recharged without removing them or in any way disassembling the flashlight.

This invention in addition contemplates a convenient connector and holder into which the flashlight, as a unit, may be inserted or snapped to electrically connect the batteries and charger to a source of electricity when the batteries require charging and to form a holder for the flashlight when not in use.

It is one object of this invention therefore to provide a flashlight of the character mentioned which is simple in design and economical to manufacture.

It is another object to provide a flashlight which retains the general characteristics as to size and shape as a conventional flashlight with the battery charger occupying a minimum of space therewithin.

It is still another object to modify a conventional flashlight with the rechargeable features with a minimum of mechanical and electrical changes therein.

The above and other objects and advantages will become more apparent from the following detailed description forming a part of this specification when read in connection with the accompanying drawing in which a preferred embodiment is shown.

FIG. 1 is a perspective view of a flashlight with portions broken away to show interior construction according to our invention;

FIG. 2 is a fragmentary view showing somewhat diagrammatically the parts adjacent the head or light end thereof;

FIG. 3 is a top view of the ring or washer element containing the batttery charger components;

FIG. 4 is a bottom view of the ring shown in FIG. 3;

FIG. 5 is a perspective view of a combined holder and connector for the flashlight;

FIG. 6 is a wiring diagram of the battery charger unit; and

FIG. 7 is an alternative form of wiring diagram.

Referring in more detail to the drawing and particularly to FIG. 1 thereof, there is illustrated a two cell flashlight consisting of a cylindrical casing 10 having a somewhat flared and enlarged lamp, reflector and lens assembly 11 at one end and a closure cap 12 at the other end.

The internal structure of this flashlight includes a spring 13 attached to the closure cap to urge the battery cells into contact with each other and cause the cell adjacent the lamp end to be urged toward and have its central positive terminal make electrical connection with the center terminal of the electric bulb 14. The spring 13 also serves to make electrical contact with the negative terminal of the adjacent battery cell and connect the same to the conductive casing 10.

The switch 15 mounted on the side of the casing has one of its terminals connected to the conductive casing and its other terminal connected to an insulated conductor 16 extending along the inner surface of the casing. The conductor 16 has its end electrically connected by resilient contact with the shell terminal of the electric bulb 14. The switch when in its "on" position will thus complete the circuit from the shell terminal of the lamp to the negative side of the battery.

The structure of flashlight above described is conventional in the art and no claim is made thereto. The structure of the battery charger and the elements associated therewith to accomplish the objects above noted and as described and claimed hereinafter are the features on which novelty and patentability are predicated.

The battery "charger" unit proper, generally designated 17, consists of a mounting element in the form of a plate or disc 18 of insulating material of a size to fit within the flashlight casing between the end of the adjacent battery cell and the lamp, reflector and lens assembly end of the flashlight as shown in FIG. 1. It is provided with a central opening 19 to fit over the end of the bulb socket 20 and be supported thereby. The disc 18 forms a mounting plate for the electrical components of the "charger" unit, which may be one of a number of different types depending on such factors as voltage of supply current, whether alternating or direct, etc. Several preferred forms of charger circuits will be described in detail hereinafter, however at this point the arrangement of mechanical details of the device will be described.

The disc 18 is provided with an output terminal 19' from the components of the charger to which is connected wire 20, which in turn passes through opening 21 in the disc and is provided at its end with a flat connector element 22 which is positioned to lie centrally over the central opening 19 in the disc, in a position to be received between and make electrical contact with the positive terminal of the adjacent battery cell and the central terminal of the lamp bulb 14. The disc 18 also has an input terminal 23 which is connected through wire 24 to an outer metallic rim 25 surrounding the disc.

Adjacent the cap 12 of the flashlight the casing 10 is provided with a ring 26 of insulating material and a metal ring 27 surrounds the insulating ring and is thus insulated from the casing 10.

The ring 27 is electrically connected to the metal rim 25 and thus to the battery charger components through the insulated conductor 28 which is connected to the ring 27 at 29. An opening 30 is provided in the casting 10 adjacent the ring 27 and the conductor 28 is passed through this opening and is extended along and secured to the inner surface of the casing. The end of the conductor 28 is positioned to resiliently contact the ring 25 at 31 in a manner similar to the connection between conductor 16 and the lamp socket heretofore described.

FIG. 5 illustrates a combined holder and electrical connector for the flashlight. It consists of a socket member 32 of metal having a rim composed of resilient fingers 33 into which the cap member of the flashlight can be snapped. Extending from the socket member, at one side thereof, is a strip 34 which carries a spring clip 35 at its end to encircle the casing 10 of the flashlight when its cap end is snapped into socket member 32. Holes 34' in the strap may be provided for attaching the holder to a support if desired.

The holder forms an electrical connector by providing lead lines to a source of electricity. The lead 36 may be soldered to the cap while lead 37 is connected to a spring finger element 38 insulated from the holder parts and positioned on the strap 34 to contact the ring 27 when the flashlight is positioned in the holder.

FIG. 6 shows one circuit, the components of which may be mounted on the disc 18 to make up the "battery charger" of the device. Briefly it is composed of a transistor Q1, two diodes CR1 and CR2 and two resistors R-1 and R-2 connected as shown. It has been found that such an arrangement affords a substantially constant proper direct current voltage and charging current for the batteries with a relatively wide variation in supply voltage and whether the latter is direct or alternating current.

An alternate circuit is illustrated in FIG. 7. This circuit may be substituted for that of FIG. 6 if the supply voltage is fixed. The value of the resistor would then be determined by the supply voltage to insure a charging current to the battery of proper value.

Having described preferred embodiments of our invention we wish it understood that we do not desire to be limited thereto but that the scope of the invention be limited only to the extent required by the prior art and as defined in the appended claims.

What is claimed is:

1. In combination with a flashlight having a casing containing a rechargeable battery, a lamp socket within one end of the casing having an electric lamp therein with one terminal thereof in electrical contact with one terminal of the battery, means to provide contact between the casing and other terminal of the battery, and a switch on the casing and electrically connected between the casing and other terminal of the lamp, apparatus for recharging said battery comprising:
    (a) a mounting plate supported by said lamp socket positioned within said casing between the battery and lamp,
    (b) electrical connector elements on said mounting plate,
    (c) at least one rectifier and one resistor on said plate electrically connected between said connector elements,
    (d) one of said connector elements electrically connected to said one terminal of said battery,
    (e) an external electrical contact element on said casing, said external contact element being electrically connected to said other connecter element on said plate,
    (f) a combined holder and connector member into which said flashlight fits, said member having elements to make electrical contact with the flashlight casing and said external electrical contact element on said flashlight casing, and
    (g) electrical conductors connected to said elements adapted to be connected to a source of electric current.

2. The structure defined in claim 1 in which the mounting plate is provided with a central opening through which the lamp socket projects to support the plate and in which the electrical connection between said connector element and said one terminal of said battery comprises a conductor connected to said connector element and having an end portion extending over said central opening and held between one terminal of said battery and said one terminal of said electric lamp.

3. The structure defined in claim 2 in which said mounting plate is circular in shape and said other connector element on said plate comprises a rim of conducting material surrounding said plate and in which said electrical connection between said external contact element and said other connector element includes a conductor in said casing resiliently contacting said rim.

4. The structure defined in claim 1 in which said external electrical contact element comprises a conducting ring surrounding and insulated from the casing.

5. The structure defined in claim 1 in which said holder and connector member comprises a socket portion having peripheral spring fingers therearound to grip the end of the flashlight casing and make electrical contact therewith,
    a spring clip member to grip the side of the flashlight and a resilient spring like finger to engage and make electrical contact with said external contact element.

6. The structure defined in claim 1 and claim 2 where the mounting plate is comprised of an electrically conducting material and the connection between the lamp socket and battery is insulated from said conducting metal plate.

7. In combination with the flashlight defined in claim 1, a constant charging current configuration for said battery comprising:
    (a) an NPN transistor whose collector is electrically connected to the outside electrical contact of said plate,
    (b) a resistor with one end electrically connected to the collector of said transistor and the other end electrically connected to the base of said transistor,
    (c) a second resistor with one end electrically connected to the emitter of said transistor and with the other end electrically connected to the center electrical contact of said plate, and
    (d) two semiconductor diodes electrically connected in series with the anode end of one connected to the cathode end of the other, and the anode end of the composite electrically connected to the base and resistor junction of said transistor and first resistor, and the cathode end electrically connected to the resistor and center electrical contact junction of said plate and second resistor.

8. In combination with the flashlight defined in claim 1, an alternate constant charging current configuration for said battery comprising:
    (a) a PNP transistor whose collector is electrically connected to center electrical contact of said plate,
    (b) a resistor with one end electrically connected to junction of collector and center contact of said transistor and said plate,
    (c) a second resistor with one end electrically connected to emitter of said transistor and the other end electrically connected to outside electrical contact of said plate, and
    (d) two semiconductor diodes electrically connected in series with the anode end of one connected to the cathode end of the other, and the cathode end of of the composite electrically connected to the base and resistor junction of the said transistor and said first resistor, and the anode end electrically connected to resistor and outside electrical contact junction of said second resistor and said plate.

References Cited

UNITED STATES PATENTS

| 2,338,078 | 12/1943 | Wood | 240—10.66 |
| 2,518,038 | 8/1950 | Malki et al. | 320—2 |
| 3,217,224 | 11/1965 | Sherwood | 320—2 |

FOREIGN PATENTS

| 1,264,752 | 7/1960 | France. | |

NORTON ANSHER, Primary Examiner

D. J. CLEMENT, Assistant Examiner

U.S. Cl. X.R.

320—2